INVENTOR
A. WILSON
BY R. C. Terry
ATTORNEY

Sept. 26, 1950 A. WILSON 2,523,748

CARRIER TELEGRAPH SYSTEM

Filed Jan. 29, 1946 3 Sheets-Sheet 2

INVENTOR
A. WILSON
BY R. C. Lerry
ATTORNEY

CARRIER TELEGRAPH SYSTEM

Filed Jan. 29, 1946 3 Sheets-Sheet 3

INVENTOR
A. WILSON
BY R. C. Terry
ATTORNEY

Patented Sept. 26, 1950 2,523,748

UNITED STATES PATENT OFFICE 2,523,748

CARRIER TELEGRAPH SYSTEM

Albert Wilson, East Rockaway, N. Y., assignor to Bell Telephone Laboratories, Incorporated, New York, N. Y., a corporation of New York Application January 29, 1946, Serial No. 644,150

14 Claims. (Cl. 250—9)

This invention relates to transmission control in a telegraph or other signaling system, particularly one employing single channel, voice-frequency carrier telegraph terminals arranged for one-way reversible operation and interconnected by radio telephone channels or land lines or a combination of both.

The single channel, voice-frequency carrier telegraph terminal provides two-way teletypewriter service over radio telephone channels and land wires. It is designed primarily to operate with "voice" radio sets operating in the very high frequency radio carrier range. The terminal equipment is capable of transmitting "start-stop" teletypewriter signals. Direct current signals are used for operating the receiving teletypewriter and voice-frequency carrier current pulses are used for transmitting to the radio equipment, the carrier current employed herein having a frequency of 1785 cycles for either direction of transmission over the radio system. It is adapted for either a two-wire or a four-wire connection to a radio set or to similar equipment at another telegraph station. It provides an automatic arrangement for controlling the radio equipment whereby there is no radiation from the transmitting antenna when signals are not being sent. This is analogous to voice service over a radio circuit on a "press-to-talk" basis where the radio link makes use of the same frequency for each direction of transmission. This teletypewriter service is called "one-way reversible." It permits originating teletypewriter messages at either end of the channel in one direction at a time but does not permit "breaking," that is, interrupting transmission from a distant station by opening the line at the receiving station.

The transmission of certain characters is required at the start of transmission for the purpose of control and the character M or any other single transition character such as blank, T, O, V and "letters" is automatically recorded at the end of a transmitted message at both the sending and the receiving stations.

An object of the invention is to control at either of two interconnected stations a local terminal and remotely connected terminals in a radio telegraph system arranged to operate on a one-way reversible basis where the transmission facility is active in only one direction at a time.

A system operating on a one-way reversible basis, differs from systems arranged to operate on a duplex basis in that transmission of a message must be completed before another of the interconnected stations can begin to transmit. In a system operating on a half-duplex basis a receiving station may interrupt at any time transmission from a sending station and begin transmitting before the incoming message is completed, and in a system operating on a full-duplex basis two independent paths are provided so that messages may be transmitted in both directions simultaneously. In the systems operating on a duplex basis two independent one-way paths employing different radio frequencies are provided.

A feature of the invention is to provide means for remotely controlling the radio transmitter and radio receiver.

Another feature is to provide means for automatically providing on a local copy of the teletypewriter at each of the interconnected terminals an "end-of-transmission" character to indicate to each of the operators whose teletypewriters are interconnected for communication in the system that the line circuit or channel is available for sending another message.

Another feature is the provision of means for using a single frequency for transmitting in opposite directions.

Another feature is the provision of means for automatically timing at the end of transmission of a message an interval of definite duration but exceeding that of the ordinary short pauses, before the "end-of transmission" character is recorded on the local copy of each of the interconnected teletypewriters.

Another feature is the provision at interconnected terminals of means operative after the completion of the transmission of an "end-of transmission" character, for supplying a "holding" current to keep the teletypewriter receiving mechanism in its normally closed condition.

Another feature is the provision of means for disabling the voice-frequency carrier current oscillator and transferring the line connections in the terminal from the sending modulator to the receiving amplifier-rectifier.

Another feature is the provision of means for placing interconnected terminals in a condition for receiving immediately after the control circuits at both ends of the teletypewriter transmission channel have completed operations.

Another feature is the provision of means responsive to several signals which are transmitted at the beginning of a period of teletypewriter transmission from the teletypewriter which is to transmit, for transferring the teletypewriter loop at the terminal that is to receive, from the teletypewriter holding circuit to the winding of the receive relay.

Other objects and features of the invention will be noted in the following description taken in conjunction with the accompanying drawings in which.

A description of the terminal equipment at station A may be had by referring to the following detailed description of the terminal equipment at station D inasmuch as the equipment at station A is identical with that at station D. The radio sets provided at the radio transmitting and receiving stations B and C are well known in the art and, therefore, a diagrammatic showing herein of the radio sets is believed to be sufficient.

Figure 1:
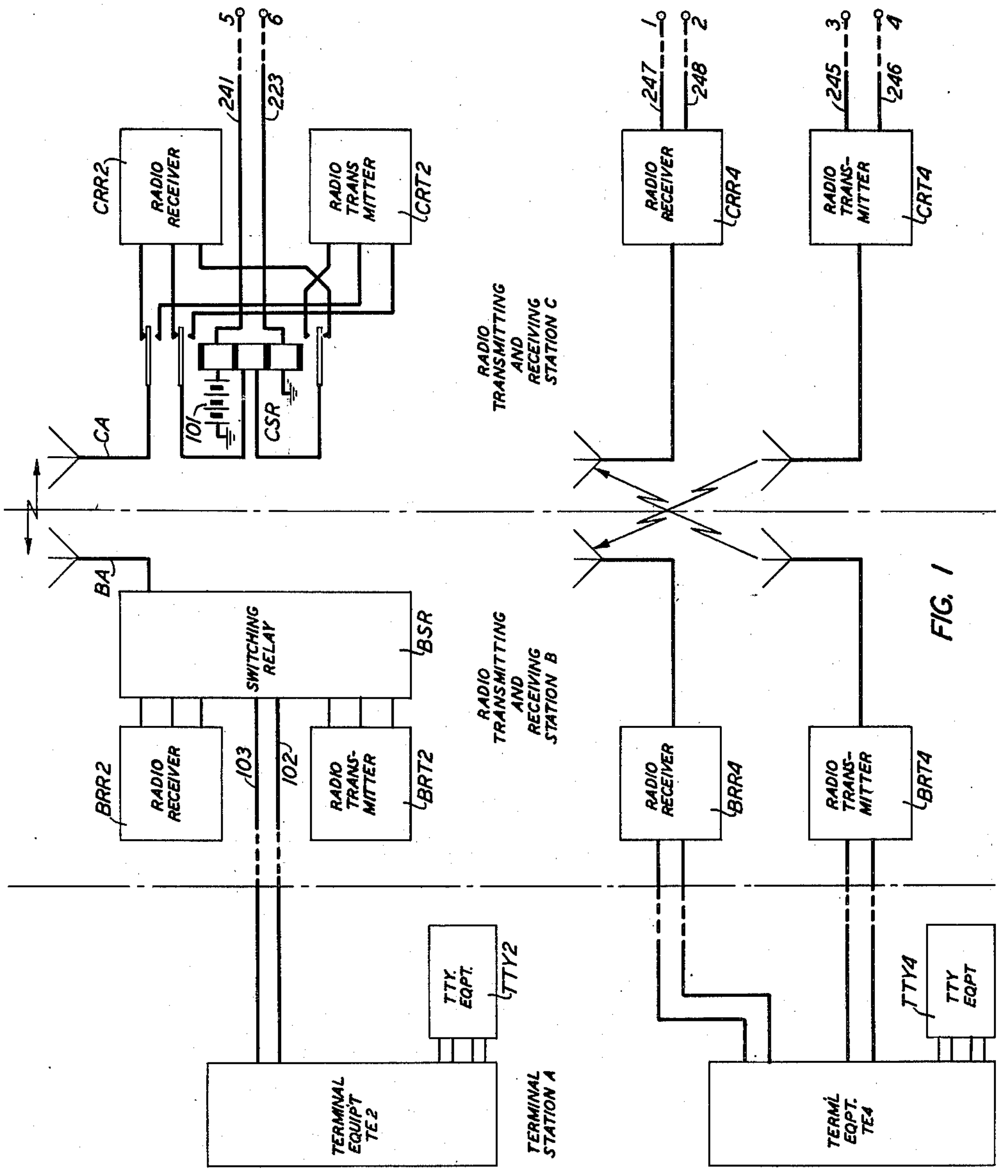
Fig. 1 shows in diagrammatic form the terminal equipment at station A and the radio transmitting and receiving equipment at each of stations B and C.
Figure 4:
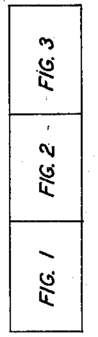
Fig. 4 shows the relative arrangement of Figs. 1 to 3.
Figure 2:
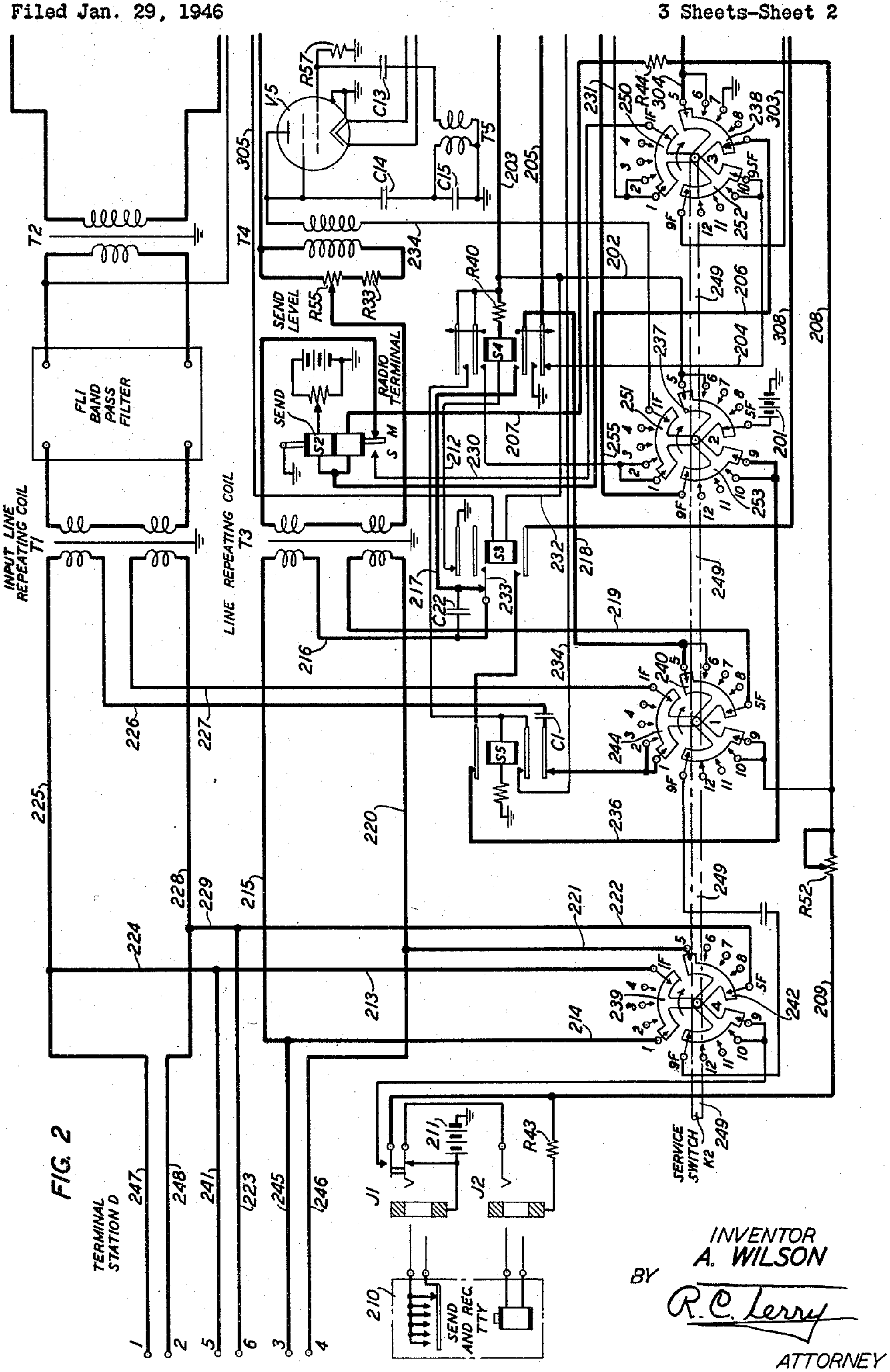
Figs 2 and 3 show in detail the schematic layout of the terminal equipment at station D, the terminal equipment at station D being identical with that provided at station A which, as hereinbefore stated, is shown in Fig. 1 but in diagrammatic form.
Figure 3:
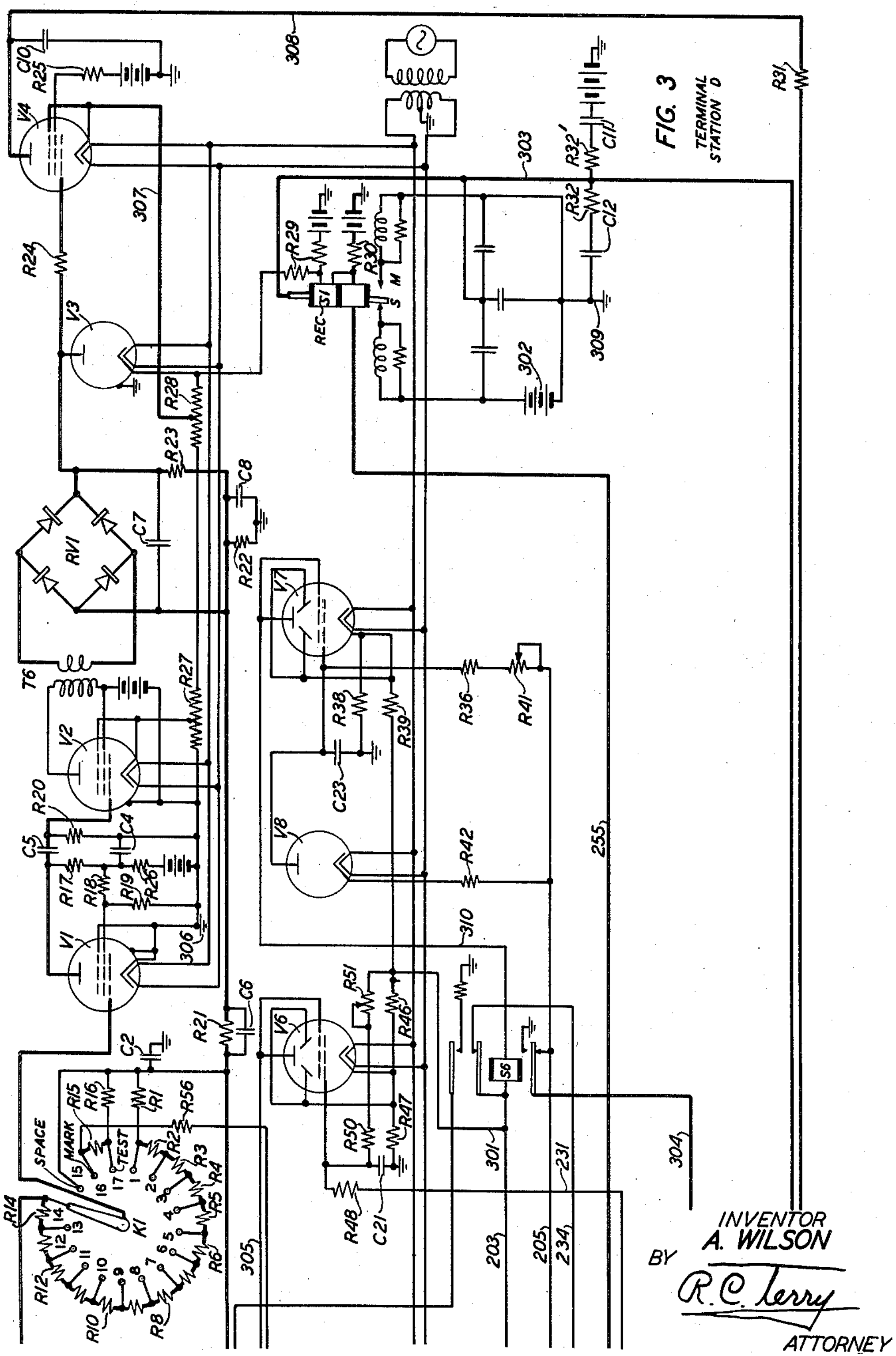

The telegraph terminal shown in Figs. 2 and 3 may be connected to the radio sets by means of a two- or a four-wire circuit arranged on one-way reversible basis, that is, where the transmission facility, as hereinbefore stated, is active in only one direction at a time. By means of the manually operable service switch either the two- or the four-wire circuit may be selected for operation, as desired. Also by means of the same switch other systems that may be provided, may be selected for connection to the radio sets at station C should the blank contacts on the switch be so equipped. In the following description it is assumed that the service switch, in its first or normal position, connects the terminal equipment at station D to the radio sets at station C over the two-wire circuit and, in its second position, connects it over the four-wire circuit, it being understood that the switch in either the first or the second position establishes connections to permit the terminal at station D to operate on a one-way reversible basis. The two terminal equipments TE2 and TE4 are shown at station B as being separate units whereas, in fact, they are combined in an arrangement such as shown in Figs. 2 and 3 representing the equipment at station D.

General Description of Terminal Equipment at Station D

In order to clearly understand the invention reference is made to Figs. 2 and 3 of the drawings.

Direct current signals sent from a teletypewriter locally connected to the terminal equipment are converted to impulses of alternating current having a frequency of 1785 cycles and are then transmitted as modulations of radio-frequency carrier over the radio link, or channel, to the distant terminal station where they are converted by radio carrier demodulation and then by rectification to direct current signals by a similar voice-frequency carrier telegraph terminal and then transmitted to a teletypewriter local to the distant terminal station. The alternating current of the frequency of 1785 cycles to which the teletypewriter signals are converted is referred to herein as the voice-frequency carrier current. The teletypewriter at each terminal station may be arranged for connection to the terminal station may be arranged for connection to the terminal equipment by means of a double-plug-ended teletypewriter cord circuit, which is inserted in a pair of jacks in the terminal equipment circuit.

The terminal equipment at station D does not transmit any current to the radio sets at station C during the idle periods, that is, when there is no transmission between stations C and B. Transmission of certain characters is required at the start of transmission for purposes of control. At the end of a transmitted message the character M, blank, T, O, V or "letters" is automatically displayed at the teletypewriters at the sending and the receiving stations.

The basic circuit elements of the terminal equipment at station D are:

(1) A receive circuit comprising a four-tube level-compensated voice-frequency carrier current amplifier-detector having vacuum tubes V1, V2, V3 and V4;

(2) A send circuit consisting of a relay-modulated 1785 cycle oscillator wherein vacuum tube V5 operates to cause carrier current to be transmitted over the radio link when marking impulses are being transmitted, there being no current on the radio link when no signals are being transmitted from either end;

(3) A transmission control circuit for (*a*) the remote control of a radio transmitter and (*b*) providing an "end-of-transmission" signal.

Switches

The terminal equipment includes three major switches whose respective functions are:

(1) Selecting the type of service desired;

(2) Adjusting the voltage level of the sending circuit;

(3) Adjusting the voltage level of the receiving circuit.

Service switch K2 selects the type of service and comprises four banks of contacts, each bank having three groups of four contacts each. Each group of a bank is in engageable relation with an arcuate brush subtending at the center of the bank an angle approaching 120 degrees and rotatably operable by a centrally located rotatable shaft. The service switch is shown in Fig. 2 arranged to provide for four kinds of service although in the present invention only two kinds are shown, namely, (1) a system arranged for one-way reversible operation to the radio sets at station C over two wires and (2) a system providing one-way reversible operation to the radio sets over four wires. The other two positions on service switch K2 are shown unequipped.

Send-level switch R55 is shown in Fig. 2 as a potentiometer but may preferably be of the circular resistance type.

Receive input switch K1 is also of the circular type having seventeen positions, fourteen of which serve to regulate manually the sensitivity of the amplifier-detector, comprising vacuum tubes V1, V2, rectifier RV1 and vacuum tubes V3 and V4. The seventeenth position serves for testing the sensitivity of the receiving circuit comprising the above-mentioned detector-amplifier, the sixteenth position serves for providing a carrier current level to operate the receive relay S1 to its marking contact and the fifteenth position serves for short-circuiting the receive input current to operate the receive relay S1 to its spacing contact.

The Oscillator

The oscillator for generating the carrier current having a frequency of 1785 cycles for transmission to either of the radio transmitters CRT2 and CRT4 at station C, depending on the type of service for which the terminal equipment at station D is set, comprises vacuum tube V5, condensers C13, C14 and C15, and transformers T4 and T5, connected in a plate feedback oscillator circuit. The send-level potentiometer R55 is connected between the secondary or output winding of transformer T4 and the right-hand winding of repeating coil T3. A pulsating direct current flows in the right-hand winding of transformer T4 as a result of the feedback connection to the tuned circuit comprising condensers C13, C14 and C15, vacuum tube V5, transformer T5 and resistor R57 to produce a frequency of 1785 cycles. The oscillations increase in amplitude until the grid voltage swing is sufficient to cause grid current to flow during a portion of the positive part of the cycle. This grid current flowing through resistor R57 furnishes a negative bias to limit the gain of vacuum tube V5 to a value which keeps the oscillator output constant. The amplified alternating current voltage at the plate of vacuum tube V5 causes an alternating current to flow in the right-hand winding of transformer T4. This induces a corresponding voltage in the left-hand winding of transformer T4. The left-hand winding of transformer T4 is bridged by potentiometer R55 and a fixed resistance R33 to control the carrier current level at the output to the left-hand, or line, windings of line repeating coil T3. The carrier current flowing in the right-hand windings of repeating coil T3 is controlled by the opening and closing of the marking, or right-hand, contact of send relay S2, which repeats signals originating in the loop circuit of the local teletypewriter. When send relay S2 is on its marking, or right-hand, contact, the circuit is closed and the carrier current flows through the right-hand winding of repeating coil T3. The operation of send relay S2 causes spurts of voice-frequency carrier current during the marking impulses of the signal pattern of the opening and closing of the loop circuit of the local teletypewriter. The voltage level should be of such value as to insure a proper level at the input to either of the radio transmitters CRT2 and CRT4 at station C, depending on the type of service as hereinbefore mentioned. The signals induced in the left-hand winding of transformer T3 comprise discrete impulses of the voice frequency carrier current of a frequency of 1785 cycles, the impulses so induced corresponding to those of the start-stop code signals originating in the loop circuit.

The Receive Circuit

The receive circuit at station D comprises input line repeating coil T1, a band-pass filter FL1, an input step-up transformer T2 which steps up the voltage of the incoming voice-frequency carrier current, a receive input switch K1 to regulate manually the sensitivity of the amplifier-detector which includes vacuum tube V1 operated at variable bias and vacuum tube V2 operated at fixed bias, output transformer T6 which couples the output of vacuum tube V2 to varistor RV1 which is a copper-oxide rectifier bridge serving to rectify the carrier current pulses, vacuum tube V3 whose function is to generate a variable bias which is fed back to the grid of vacuum tube V1, vacuum tube V4 whose function is to amplify the direct current pulses produced by the copper-oxide rectifier RV1, a capacitor-resistor network in which regulating bias is produced by means of resistors R21, R22 and R23 and condensers C2, C6, C7 and C8, and receive relay S1 actuated by plate current from vacuum tube V4 in accordance with the received signals.

Amplifier-Detector

The incoming voice-frequency carrier current signals received from the line pass through input line repeating coil T1, band-pass filter FL1 aad step-up transformer T2, and are then amplified by a two-stage amplifier. The first stage comprises vacuum tube V1 operated with a variable bias which enables the gain of the amplifier to be varied as described hereinafter. The amplified carrier current signals are then rectified by a full-wave copper-oxide rectifier RV1 and then passed through a third stage operated as a direct current amplifier. This produces a nearly square-topped wave to operate receive relay S1 which, in turn, repeats the signals to the loop circuit of the local teletypewriter. Automatic gain control voltage is provided by vacuum tube V3 which is a diode connected to the copper-oxide rectifier output. The incoming carrier current signals from filter FL1 are passed through transformer T2 where the carrier current signal voltage is stepped up and then applied to the group of resistors R1 to R14. The receive input switch K1 selects points along this group of resistors to control the magnitude of the carrier current signal voltage applied to the grid of vacuum tube V1. The output voltage of vacuum tube V1 is fairly constant due to a grid bias appearing across condenser C2 which varies with the input level. Vacuum tube V1 is operated at a low screen potential to increase the sensitivity of the variable gain characteristic, resistor R26 and condenser C4 serving to filter the plate voltage supplied to vacuum tube V1. The output voltage appears across resistor R17 and is coupled to vacuum tube V2 by condenser C5 and resistor R20. Cathode bias for vacuum tube V2 is obtained by the voltage drop across a portion of tapped resistor R27. Vacuum tube V2 raises the voltage of the carrier current signal to a suitable value for rectification. Output transformer T6 couples the output of vacuum tube V2 to varistor or full wave rectifier RV1. A full-wave rectified carrier signal voltage appears across resistor R23 which is shunted by condenser C7 and thereby serves to filter out the carrier current frequency. Direct current voltage then appearing across resistor R23 is applied to the grid of vacuum tube V4, through resistor R24 and to the plate of vacuum tube V3. The cathode bias of vacuum tube V3 is obtained from the voltage drop across resistors R27 and R28 and the cathode bias of vacuum tube V4 is obtained from the voltage drop across resistor R27 and part, or section, of resistor R28. The cathode bias voltage of vacuum tube V3 is at a higher positive potential than that of vacuum tube V4. Resistor R24 prevents any excessive grid current flowing in vacuum tube V4. The plate current of vacuum tube V4 operates receive relay S1 to its marking, or right-hand, contact. At this time the plate current, on a basis of 115-volt source of current supply, is approximately six milliamperes flowing through the lower winding of receive relay S1, while the biasing current flowing in the upper winding is approximately 0.3 milliampere. When no carrier current signals are being received, vacuum tube V4 is cut off by its cathode bias dropping the plate current to zero while the biasing current flowing in the upper winding of relay S1 increases to approximately six milliamperes to operate receive relay S1 to its spacing, or left-hand contact. Condenser C10 serves to further filter the carrier current frequency from the signals operating receive relay S1.

Voltage Level Function

Voltage level-compensation is the purpose of diode vacuum tube V3 whereby automatic gain or level control for the receive circuit is provided. The plate-cathode circuit of vacuum tube V3 in series with resistors R22, R27 and R28, is connected to the output of varistor RV1 in parallel with resistor R23. The grid-cathode circuit of vacuum tube V4 in series with the left-hand section of resistor R28 and resistors R27 and R22 is also in parallel with resistor R23. The cathode bias of vacuum tube V3 is sufficiently high to keep the tube non-conductive except when the plate potential is high enough to cause plate current to flow. During marking impulse intervals the voltage of the plate of vacuum tube V3 is held at a value near zero, with the amplifier at maximum gain. If the level of the incoming carrier current is such that the grid potential becomes high enough to draw a grid current, a voltage will develop across resistor R22 and condenser C8. The voltage developed across resistor R22 supplies the control bias on vacuum tube V1, since the voltage across resistor R22 applied to condenser C2 through resistor R21, places a negative voltage on the control grid to reduce the gain. The effect on vacuum tube V4 of the voltage across resistor R22 is small compared with the total biasing voltage on that tube. Hence, since the signal voltage applied to the control grid of vacuum tube V4 is held essentially constant during the marking intervals, the signals in the receiving, or load, circuit will be very little distorted by normal variations in the level of the incoming carrier current signals. Resistor R21 prevents the control voltage across condenser C2 from changing rapidly. Momentary increases in signal level to the detector circuit are thus prevented from changing the gain of the amplifier stages appreciably. Condenser C6 enables the circuit to regain its normal operating condition quickly after the circuit has been in a spacing condition for a long period of time.

Receive Input Switch K1

The steps on the receive input switch have been so selected as to provide steps of five decibels each between point No. 1 and point No. 14, the latter being the step for maximum gain of the amplifier circuit. Settings of the receive input switch correspond to various levels of the incoming carrier current at the line repeating coil T1 between +35 decibels at step No. 1 and −30 decibels at step No. 14, step No. 8 representing an incoming signal level of 0 decibel.

Three other positions on the receive input switch are provided, as hereinbefore stated, one for testing the sensitivity of the receiving circuit, a second for providing a carrier current level to operate receive relay S1 to its marking, or right-hand, contact, and a third for short-circuiting the receive input to operate receive relay S1 to its spacing, or left-hand contact. The test position of the receive input switch provides a source of carrier current from the oscillator at a level of approximately −55 decibels. This level of carrier current input is sufficient to give a certain minimum voltage across resistor R31. Failure to obtain this voltage is an indication that the gain of the amplifier stages is insufficient and the vacuum tubes of the receiver should be checked.

Polar Relays

Receive relay S1 and send relay S2 have two windings each. The two windings on each relay have the same number of turns and, therefore, exert the same magnetizing effect for a given value of current on the relay magnetic circuit. Thus if the current flowing in one winding of a relay is equal to the current flowing in the other winding, but opposite in direction, the magnetizing effect will be neutralized and no operation will take place. The arrangement of winding terminals is such that, with respect to receive relay S1, if a positive potential is applied to the upper terminal of the upper winding, or to the right-hand terminal of the lower winding, and negative potential is applied to the terminals on the opposite ends of the respective above-mentioned windings, the relay armature will operate to its marking, or right-hand, contact, and with respect to send relay S2, if positive potential is applied to the left-hand terminal of the upper winding or to the right-hand terminal of the lower winding, and negative potential is applied to the terminals on the opposite ends of the respective above-mentioned windings, the armature of send relay S2 will also operate to its marking, or right-hand, contact. If the potentials are reversed, then, with respect to receive relay S1, if negative potential is applied to the upper terminal of the upper winding or to the right-hand terminal of the lower winding, and positive potential is applied to the terminals on the opposite ends of the respective above-mentioned windings, the armature of receive relay S1 will operate to its spacing, or left-hand, contact and, with respect to send relay S2, if negative potential is applied to the left-hand terminal of the upper winding or to the right-hand terminal of the lower winding, and positive potential is applied to the terminals on the opposite ends of the respective above-mentioned windings, the armature of send relay S2 will operate to its spacing, or left-hand, contact. Receive relay S1 and send relay S2 are of a type which are quite sensitive and will operate on a current of approximately 1.2 milliamperes in one winding or on a difference of current of 1.2 milliamperes if the two currents flow through the windings in opposite directions.

Loop Circuit

The loop circuit to which the teletypewriter is connected is the same whether the terminal is operated on a two- or four-wire basis to the radio sets at station C. The send loop current can be adjusted to 60 milliamperes by means of the rheostat R52. The 60-milliampere loop current flows through the lower winding of send relay S2 in a direction to operate the relay to its marking, or right-hand, contact. This current is twice the current flowing through the upper winding. Therefore, the relay remains on its marking contact. When the operator at the local teletypewriter opens the loop circuit by operating one of the keys on the teletypewriter keyboard, the loop current decreases to zero and the current in the upper winding operates send relay S2 to its spacing, or left-hand, contact. Transmitting contacts of the teletypewriter open and close the loop circuit causing send relay S2 to repeat each signal. Send relay S2 opens and closes the source of carrier current having a frequency of 1785 cycles for transmission to the radio transmitter at station C of a series of discrete impulses of the given frequency. Transmission to the local teletypewriter is accomplished by means of receive relay S1 which receives the demodulated signals from the carrier current receiver and transmits these signals to the loop circuit. When the telegraph terminal is in a receive condition the loop is terminated at the contacts of receive relay S1. When no carrier current is being received receive relay S1 is in its spacing position. When receive relay S1 is in its spacing, or left-hand, position, the current in the loop drops to approximately zero. When carrier current is being received, receive relay S1 operates to its marking contact and ground is applied to the loop. Under this condition the loop current is of 60 milliamperes and passes through the lower winding of send relay S2 in a marking direction. Current through the upper winding of send relay S2 returns to 30 milliamperes in a spacing direction. Send relay S2 remains in a marking condition when the current through its lower winding controls the position of the armature. When receive relay S1 is in its spacing position the current through the upper winding of send relay S2 is reversed and is in a direction to hold send relay S2 on its marking contact.

One-Way Reversible Two-Wire or Four-Wire

The circuit arrangement of the direct current loop of the teletypewriter, local to each station having telegraph terminal equipment, is the same when the terminal equipment is operating with the radio equipment on a one-way reversible basis with either the two-wire or four-wire circuit path extending to radio transmitting and receiving station C.

Detailed Description of Operation

*Transmission—General*

In order to operate the telegraph terminal on a one-way reversible basis the carrier current telegraph terminals interconnected in the system must be in a receiving condition and no radio frequency is radiated by the radio sets during periods of "no transmission." It is necessary to provide auxiliary controls to keep the local loops normally closed, that is, in "marking" condition, to prevent the teletypewriter at either terminal from running open and also to prepare the circuit for normal transmission. The control circuit involves the use of three vacuum tubes V6, V7 and V8 and four relays S3, S4, S5 and S6 which, herein, are assumed to be effectively energized from a local source of direct current of approximately 115 volts.

*Idle condition*

During the idle condition, as hereinafter described, no voice carrier current is being transmitted. Under this condition send relay S2 is in its marking position with the loop terminated at ground on the front contact of relay S6 which is in an operated position, and the armature of receive relay S1 is on its spacing contact.

The positive pole of grounded 115-volt battery 201 is connected to a circuit extending over feeder contact 5F in engagement through rotatable brush 237 with contact No. 5 on bank No. 2 of service switch K2, conductors 202, 203 and 301, rheostat R51, resistor R50, to the grid of vacuum tube V6. The cathode of vacuum tube V6 is at a much lower positive potential than its associated grid, which causes vacuum tube V6 to conduct. The current in the plate circuit of vacuum tube V6 will cause relay S3 to operate, the circuit being traceable from grounded positive battery 201 to conductor 202 as hereinbefore traced, then over conductor 232, through the winding of relay S3, conductor 305, plate and cathode of vacuum tube V6, resistor R47, to ground. With relay S3 operated relays S4 and S5 are released, as hereinafter described. Vacuum tube V7 has positive potential applied to its grid in a path traceable from the positive pole of grounded battery 302, spacing, or left-hand, contact and armature of receive relay S1, conductor 303, feeder contact 9F in engagement through rotatable brush 238 with contact No. 9 on bank No. 3 of service switch K2, conductor 204, back contact and outer lower armature of relay S4, conductor 205, rheostat R41, resistor R36, then in parallel paths, one to the grid of vacuum tube V7 and the other to condenser C23 to ground. As soon as condenser C23 becomes sufficiently charged vacuum tube V7 becomes conducting and relay S6 therefore operates in the path extending from conductors 202 and 203, through the winding of relay S6, conductor 310, plate and cathode of vacuum tube V7, and resistor R38, to ground. Ground at the front contact and lower armature of relay S6 terminates the teletypewriter loop traceable over conductor 304, contact No. 5 in engagement through brush 238 with feeder contact 5F on bank No. 3 of service switch K2, conductor 206, through the lower winding of send relay S2, conductor 207, resistor R44, conductor 208, rheostat R52, conductor 209, sleeve conductor of jack J2, through the winding of the selector magnet of teletypewriter 210, tip conductor of jack J2, tip conductor of jack J1, through the transmitting contacts of teletypewriter 210, sleeve conductor of jack J1, to grounded positive battery 211, and send relay S2 is thereby held in its marking position during the idle and receiving periods.

It may be noted that the relay S3, upon operating, opens at its outer upper armature and contact the direct current control path which is traceable over conductor 212, through the winding of relay S4, resistor R40, conductor 202 to which grounded positive battery 201 is connected through bank No. 2 on service switch K2, whereby the operating circuit of relay S4 is opened to release relay S4. Relay S4, upon releasing, opens (1) at its outer upper armature and contact the operating circuit for relay S5 which also releases as hereinbefore stated, and (2) at its inner lower armature and contact the alternating, or carrier, current transmitting path to the radio terminal on the line, or left-hand, side of repeating coil T3, the alternating, or carrier, current transmitting path being traceable from the conductor 215, upper left-hand winding of repeating coil T3, conductor 216, contacts 233 which are also open during the idle condition due to the operated condition of relay S3, conductor 217, contact and inner lower armature of relay S4, conductor 218, contact No. 5 in engagement through rotatable brush 240 with feeder contact No. 5F on bank No. 1 of service switch K2, conductor 219, through the lower left-hand winding of repeating coil T3 and conductor 220. The alternating, or voice-frequency carrier, current transmission path has two courses over which it may be extended, depending on whether the radio line circuit is of the two- or the four-wire type. In the two-wire type, conductor 215 of the alternating current transmission path is extended over conductor 214, contact No. 1 in engagement through rotatable brush 239 with feeder contact No. 1F on bank No. 4 of service switch K2, conductors 213 and 241, through the uppermost winding of switching relay CSR at station C, to grounded positive battery 101 and conductor 220 of the alternating current transmission path is extended over conductor 221, contact No. 5 in engagement through rotatable brush 242 with feeder contact No. 5 on bank No. 4 of service switch K2, conductors 222 and 223, through the lowermost winding of switching relay CSR at station C, to ground. Switching relay CSR is of a transformer type which will be hereinafter described. In the four-wire type, conductor 215 is connected directly to conductor 245 and conductor 220 is connected directly to conductor 246, conductors 245 and 246 being connected at their respective other ends directly to the radio transmitter CRT4 at station C.

For the purpose of setting forth at this time a differentiation between the alternating, or carrier, current transmitting path and the alternating, or carrier, current receiving path for both the two-wire and the four-wire types, a brief description of the alternating, or carrier, current receiving paths for the two-wire type will now be given. In the two-wire type circuit arrangement conductors 241 and 223 are employed in both the transmitting and receiving paths. Conductor 241, for receiving, is extended over conductors 224 and 225, through the upper left-hand winding of input line repeating coil T1, conductor 226, condenser C1, outer lower armature and contact of relay S5, contact No. 1 in engagement through rotatable brush 244 with feeder contact No. 1F on bank No. 1 of service switch K2, conductor 227, through the lower left-hand winding of repeating coil T1, conductors 228 and 229, and back over conductor 223. Conductor 241, for transmitting, is extended over conductor 213, feeder contact 1F in engagement through rotatable brush 239 with contact No. 1 on bank No. 4 of service switch K2, conductors 214 and 215, repeating coil T3, conductor 216, condenser C22 and contacts 233, in parallel, conductor 217, contact and inner lower armature of relay S4, contact No. 5 in engagement through rotatable brush 240 with feeder contact No. 5F of bank No. 1, conductor 219, through the lower left-hand winding of repeating coil T3, conductors 220 and 221, contact No. 5 in engagement through rotatable brush 242 with feeder contact 5F, conductor 222, and back over conductor 223. In the four-wire type, the receiving path is separate and distinct from the transmitting path in that the receiving path comprises conductors 247 and 248 which, at one end, extend to the radio receiver CRR4 at station C and at the other end conductor 247 is connected to conductor 225, through the upper left-hand winding of repeating coil T1, conductor 226, condenser C1, contact No. 1 in engagement through brush 244 with feeder contact No. 1F on bank No. 1 of service switch K2, conductor 227, through the lower left-hand winding of repeater coil T1, conductor 228 and back to conductor 248. The transmitting path for the four-wire type comprises conductors 245 and 246 which connect at one end to the radio transmitter CRT4 at station C, and at the other end conductor 245 is connected through conductor 215, the upper left-hand winding of repeating coil T3, conductor 216, condenser C22 and contacts 233, in parallel, conductor 217, contact and inner lower armature of relay S4, conductor 218, contact No. 5 in engagement through rotatable brush 240, with feeder contact No. 5F, conductor 219, through the lower left-hand winding of repeating coil T3, conductor 220, and back to conductor 246.

It may be noted that the carrier current receiving circuit in both the two-wire and the four-wire arrangements is traceable from conductor 225, upper left-hand winding of input line repeating coil T1, conductor 226, condenser C1, outer lower armature and contact of relay S5, contact No. 1 in engagement through brush 244 with feeder contact No. 1F on bank No. 1 of service switch K2, conductor 227, through the lower left-hand winding of input line repeating coil T1, conductor 228, and this path is completed only upon the release of relay S5.

The condition of the control vacuum tubes and the control relays in the local terminal equipment during the idle and the receiving periods, that is, under the condition wherein there is "no transmission" to the distant terminal equipment, is as follows:

| Vacuum Tube | Relay | Condition |
|---|---|---|
| V6 | ------ | Conducting. |
| ------ | S3 | Operated. |
| ------ | S4 | Released. |
| ------ | S5 | Do. |
| V7 | ------ | Conducting. |
| ------ | S6 | Operated. |

*Selection of service*

The types of systems arranged for one-way reversible operation may be selected by turning the knob, not shown, on the left-hand end of the shaft 249 of service switch K2 to any one of the equipped positions, the first, or normal, position being that equipped for two-wire service, the second, for four-wire service, and the third and the fourth are unequipped but are provided for any other kind of service such as for telegraph systems operating on a half- or a full-duplex basis.

*One-way reversible two-wire operation*

Assume that the service switch K2 is in its first, or normal, position to select the system arranged for the one-way reversible two-wire operation.

When the operator at teletypewriter 210 sends the functional signal "LETTERS" send relay S2 momentarily operates to its space, or left-hand position. The momentarily connected ground at the spacing contact of send relay S2 is connected to the grid of vacuum tube V6, which may be of the beam type, in a circuit traceable over conductor 230, feeder contact No. 1F in engagement through rotatable brush 250 with contact No. 1 on bank No. 3 of service switch K2, conductor 231, resistor R48, to the grid of vacuum tube V6, and the grid will now become negative with respect to the cathode to stop the plate current flowing in the operating circuit for relay S3. The operating circuit for relay S3, as hereinbefore traced, extends from the plate of vacuum tube V6, conductor 305, through the winding of relay S3, conductors 232 and 202, contact No. 5 in engagement through rotatable brush 237 with feeder contact No. 5F on bank No. 2 of service switch K2, to grounded positive battery 201.

Relay S3, upon releasing, performs two functions: (1) it closes, at its inner upper armature, contacts 233 to form a shunt path around condenser C22 associated with the upper left-hand winding of repeating coil T3, to permit a direct current path through the uppermost and the lowermost winding of switching relay CSR whereby the armatures of the switching relay are attracted; (2) it closes at its outer upper armature the operating circuit for relay S4 which operates, the operating circuit being traceable over conductor 212, through the winding of relay S4, resistor R40, conductor 202 to which grounded positive battery 201 is connected through the No. 5 contact on bank No. 2 of service switch K2. Relay S4, upon operating, (1) connects grounded positive battery 201 to a circuit traceable over the No. 5 contacts on bank No. 2 of service switch K2, conductor 202, inner upper armature of relay S4, No. 1 contact in engagement through rotatable brush 251 with feeder contact No. 1F on bank No. 2 of service switch K2, conductor 234, right-hand winding of transformer T4, to the plate of vacuum tube V5 and also through the tuned circuit comprising condensers C15, C14 and C13, resistor 57 and transformer T5 whereby the oscillating circuit, comprising vacuum tube V5 and the tuned circuit, generates an alternating current of the frequency of 1785 cycles; (2) closes at its inner lower armature the alternating current transmitting path which includes contact 233 as hereinbefore described; (3) closes at its outer upper armature the obvious operating circuit for relay S5; (4) opens at its outer lower armature and back contact a circuit traceable from the grid of vacuum tube V7 which may also be of the beam type, resistor R36, rheostat R41, conductor 205, outer lower armature and back contact of relay S4, conductor 204, contact No. 9 in engagement through rotatable brush 252 with feeder contact 9F on bank No. 3 of service switch K2, conductor 303, to the armature of receive relay S1; and (5) at its outer lower armature and front contact connects ground to the grid of vacuum tube V7 over conductor 205. The ground just described as being connected to the outer lower armature and front contact of relay S4 also serves as a termination for the loop circuit to teletypewriter 210 when relay S6 releases. This ground, which is connected at this time to the grid of vacuum tube V7, prevents vacuum tube V7 from conducting since the grid of the tube will now be negative with respect to its cathode. When vacuum tube V7 stops conducting, relay S6 releases. Relay S6, upon releasing (1) removes at its lower armature and front contact the former ground connection for the termination of the loop circuit of teletypewriter 210 inasmuch as the new ground has been substituted at the outer lower armature and front contact of operated relay S4, and (2) closes at its inner upper armature and contact a holding circuit for relay S5 which may be traced from the grounded winding and inner lower armature of relay S5, conductor 234, inner upper armature and contact of relay S6, conductors 203 and 202, to grounded positive battery 201 on the contact No. 5 in engagement through rotatable brush 237 with feeder contact No. 5F on bank No. 2 of service switch K2.

The condition of the control tubes and the control relays under the condition of transmission to the distant terminal equipment is as follows:

| Vacuum Tube | Relay | Condition |
|---|---|---|
| V6 | ------ | Non-conducting. |
| -------- | S3 | Released. |
| ------ | S4 | Operated. |
| ------ | S5 | Do. |
| V7 | ------ | Non-conducting. |
| ------ | S6 | Released. |

Transmission from teletypewriter 210 can now be continued over the teletypewriter transmitting circuit which may be traced from grounded positive battery 211, sleeve conductor of jack J1, transmitting contacts of teletypewriter 210, tip conductor of jack J1, tip conductor of jack J2, through the winding of printer selector magnet of teletypewriter 210, sleeve conductor of jack J2, resistor R43, conductor 209, rheostat R52, conductor 208, resistor R44, conductor 207, through the lower winding of send relay S2, conductor 206, feeder contact No. 5F in engagement through brush 238 with contact 5 on bank 3 of service switch K2, conductor 304, lower armature and back contact of relay S6, conductor 205, outer lower armature and front contact of relay S4, to ground. Then send relay S2 responds to the signal impulses received from the teletypewriter 210 and each time the send relay S2 operates to its marking, or right-hand, contact carrier current of a frequency of 1785 cycles is induced in the left-hand winding of transformer T4 and transmitted over the send-level potentiometer R55, through the right-hand winding of line repeating coil T3, to ground at the marking, or right-hand, contact and armature of send relay S2. No carrier current is transmitted when send relay S2 is operated to its spacing, or left-hand, contact. These impulses of carrier current are induced in the left-hand winding of line repeating coil T3 and repeated over the alternating current transmission path hereinbefore described, as including contacts 233 and conductors 241, 213, 214, 215, 216, 217, 218, 219, 220, 221, 222 and 223. These impulses of carrier current are repeated by the combination switching relay and transformer CSR at station C into the radio transmitter CRT2 which transmits radio frequency carrier under the control of the voice-frequency carrier signals over antenna CA for transmission to antenna BA at station B. Switching relay CSR receives the carrier current component of the signals in its uppermost and its lowermost winding and induces such component into its middle winding for transmission to radio transmitter CRT2. The combination switching relay at station B is represented diagrammatically by block BSR. The combination switching relay at station B is identical with combination relay CSR at station C. The signals received over antenna BA are amplified and detected by radio receiver BRR2 for transmission into the middle winding of combination switching relay BSR which serves as output coil for the radio receiver. The voice frequency carrier current of each of the signals delivered by radio receiver BRR2 is induced in the uppermost and the lowermost winding of combination switching relay BSR for transmission over conductors 103 and 102 to terminal equipment TE2 at terminal station A. The terminal equipment TE2 at station A is identical with that shown in Figs. 2 and 3 as hereinbefore mentioned.

The carrier current impulses received at terminal equipment TE2 will operate apparatus that is identical with the corresponding apparatus at terminal station D. Therefore, conductors 241 and 223 at station C will be assumed herein to be the conductors that are receiving the transmission at terminal station A and, therefore, they will direct the impulses of carrier current over the alternating current receiving path, such as that hereinbefore described as including conductors 224 and 225, upper left-hand winding of repeating coil T1, conductor 226, condenser C1, outer lower armature and contact of relay S5, contact Nos. 1 and 1F interconnected by brush 244 on bank No. 1 of service switch K2, conductor 227, lower left-hand winding of repeating coil T1, conductors 228 and 229, and back to conductor 223. The signal impulses of carrier current received by the left-hand windings of repeating coil T1 are induced into the right-hand windings of the coil and passed through band-pass filter FL1 to the left-hand winding of input transformer T2. These impulses are stepped up in voltage by transformer T2 and are directed through the receive input switch K1 to the two-stage amplifier comprising vacuum tubes V1 and V2. The output of vacuum tube V2 is impressed through output transformer T6 upon varistor RV1 which rectifies the carrier pulses and provides direct current pulses. The direct current pulses are impressed on vacuum tubes V3 and V4, vacuum tube V3 serving to provide automatic gain or level control by generating a variable bias feedback to the grid of vacuum tube V1, and vacuum tube V4 produces plate current in response to each direct current impulse for operating receive relay S1 in a circuit traceable from ground connection 306, resistor R27, part of the resistance of resistor R28, conductor 307, cathode and plate of vacuum tube V4, conductor 308, lower armature and contact of relay S3 which will be in an operated condition when its equipment circuit is receiving, upper armature and contact of relay S5, conductor 236, contacts Nos. 9 and 9F in engagement with the rotatable brush 253 on bank No. 2 of service switch K2, conductor 255, through the lower winding of receive relay S1, resistor R30 and grounded positive battery.

Receive relay S1 is normally in its idle or receive condition, that is, spacing, when there are no signals being received. However, as soon as the incoming "letters" signal is received at station D to make vacuum tube V4 conductive, receive relay S1 will operate to its marking, or right-hand, position in response to the incoming functional signal "letters" which is all marking except for the "start" pulse, and receive relay S1 in its marking position connects ground to a circuit traceable over conductor 303, contacts Nos. 9F and 9 in engagement with rotatable brush 252 on bank 3 of service switch K2, conductor 204, back contact and outer lower armature of relay S4, conductor 205, potentiometer R41 and resistor 36 to the grid of vacuum tube V7. Vacuum tube V7 will become at this time nonconducting and relay S6 will consequently release. Relay S6, in its released position, transfers the loop circuit for teletypewriter 210 which is now assumed to be receiving, to the armature of receive relay S1, the loop circuit now being traceable from ground 309, marking contact and armature of receive relay S1, conductor 303, interengaged contact Nos. 9F and 9 on bank 3 of service switch K2, conductor 204, back contact and outer lower armature of relay S4, conductor 205, back contact and lower armature of relay S6, conductor 304, interengaged contacts Nos. 5 and 5F on bank No. 3 of service switch K2, conductor 206, through the lower winding of send relay S2, conductor 207, rheostat R44, conductor 208, rheostat R52, conductor 209, resistor R43 and teletypewriter 210, through jacks J1 and J2. Teletypewriter 210 is therefore prepared to respond to the receive relay S1 which follows the incoming signals.

The transmitting teletypewriter then transmits the functional signals "carriage return" the "line feed", in turn, so that the teletypewriters at both ends of the system are brought into the same operable position. The receive relay, such as relay S1, at the receiving station upon being responsive to the incoming signal impulses, causes its armature to move intermittently between its marking and spacing contacts and thereby transmits the message to the loop of the receiving teletypewriter.

During the transmission of a message from one station and its reception at the other station ground at the marking, or right hand, contact of the receive relay S1 at the receiving station is intermittently connected to the loop circuit of the receiving teletypewriter and at the same time to the other parallel path which extends, as hereinbefore described, through rheostat R41, resistor R36 to the grid of vacuum tube V7 and condenser C23. The tube V7 and condenser C23 serve as part of a timing circuit. The ground intermittently connected to the grid of tube V7 maintains this tube non-conducting since the grid will now be held negative in relation to its associated cathode, and relay S6 at the receiving station will consequently remain released during the reception of the incoming message. The constants of the timing circuit at each station consisting of the resistance element, such as rheostat R41, and resistor R36 and condenser C23 and vacuum tube V8 connected as a diode across rheostat R41 and resistor R42 at the station receiving are such that the maximum normal signal spacing interval of 132 milliseconds is not sufficient to cause the vacuum tube V7 to conduct and operate relay S6 during message transmission.

*End of transmission at sending station*

At the conclusion of transmission of a message, say, from the teletypewriter 210 at station D, the teletypewriter loop circuit will remain closed and send relay S2 will remain on its marking, or right-hand, contact. With send relay S2 on its marking contact, the ground which previously was connected intermittently to the grid of vacuum tube V6 will no longer be present and grounded positive battery 201 now causes vacuum tube V6 to conduct. The conductivity of vacuum tube V6 is delayed for a period of 2 to 5 seconds by the charging time of condenser C21 which starts to charge through rheostat R51 and resistor R50. At the end of this period, relay S3 will operate due to the plate current flowing in vacuum tube V6. Relay S3, upon operating, removes at make-before-break contact 233, the short-circuit existing around condenser C22, thereby inserting condenser C22 in the alternating current transmission path to the radio transmitter at the next adjoining station, say station C. The insertion of condenser C22 in the alternating current transmission path opens the direct current path to release the combination switching relay and transformer CSR. Switch relay CSR at station C then releases to thereby release radio transmitter CRT2. With send relay S2, in its marking condition, voice-frequency carrier current continues to be transmitted to the radio transmitter at station C until relay S4 is released. Relay S4 is under control of a back contact of relay S3 and starts to release as soon as relay S3 operates. Relay S4 is of the slow-to-release type. This provides a short interval between the release of the radio transmitter control relay S3 and the removal of the signal from the line circuit to the radio transmitter at station C.

Relay S4, upon releasing, (1) closes at its outer, lower armature and back contact a circuit for connecting grounded positive battery 302 to the loop circuit of teletypewriter 210 thereby placing the teletypewriter 210 in a spacing condition, the circuit being traceable from grounded positive battery 302, spacing contact and armature of receive relay S1, conductor 303, interengaged contacts Nos. 9F and 9 on bank No. 3 of service switch K2, conductor 204, back contact and outer lower armature of relay S4, conductor 205, back contact and lower armature of relay S6, conductor 304, interengaged contact Nos. 5 and 5F on bank No. 3 of service switch K2, conductor 206, through the lower winding of send relay S2, conductor 207, resistor R44, conductor 208, rheostat R52, conductor 209, resistor R43, sleeve conductor of jack J2, through the winding of printer selector magnet of teletypewriter 210, tip conductor of jack J2, tip conductor of jack J1, through the transmitting contacts of teletypewriter 210, sleeve conductor of jack J1, to grounded positive battery 211, there being grounded positive batteries on opposite ends of the circuit to cause send relay S2 to operate to its spacing position; (2) opens at its outer upper armature and contact the operating circuit for relay S5 but relay S5 remains operated over its locking circuit traceable over its inner lower armature and contact, conductor 234, contact and inner upper armature of relay S6, conductor 203 and 202, interengaged Nos. 5 and 5F contacts on bank No. 2 of service switch K2, to grounded positive battery 201; (3) opens at its inner lower armature and contact the alternating current transmission path through condenser C22 and the left-hand windings of line repeating coil T3 to insure the release of the combination switching relay and transformer CSR; (4) removes at its inner upper armature and contact the source of potential (grounded positive battery 201) from the oscillator circuit connected to conductor 234; (5) removes at its outer lower armature and front contact the ground connection from the grid of vacuum tube V7 whereby the outer lower armature now engages its back contact to connect grounded positive potential from battery 302, over the spacing contact and armature of receive relay S1, conductor 303, interengaged contacts Nos. 9F and 9 on bank No. 3 of service switch K2, conductor 204, back contact and outer lower armature of relay S4, conductor 205, rheostat R41, resistor R36 to the grid of vacuum tube V7, and vacuum tube V7 starts to conduct as condenser C23 charges through resistor R36 and rheostat R41. Under this condition vacuum tube V8 which is bridged across resistor R36 and rheostat R41 is not conducting since the plate of the latter vacuum tube is at a lower positive potential than its associated cathode. Vacuum tube V7, upon conducting, operates relay S6.

An interval intervenes the release of relay S4 and the operation of relay S6 during which the teletypewriter loop at the sending station is open, which is a spacing condition. The interval is adjustable by means of condenser C23 and resistor R41 to control the operate time of relay S6 and thereby determine which of the code combinations for "blank," T, O, M, V and "letters" is to be used as the end of transmission character. If the interval is adjusted to be 229 milliseconds, the spacing condition will be of a duration equal to a full start-stop code combination, which is 163 milliseconds, plus a continuing spacing condition of 66 milliseconds which is equal to three impulses of a code combination. Upon the operation of relay S6 the spacing condition of the loop is changed to a marking condition, and the local teletypewriter interprets the first 163 milliseconds of the spacing interval as a blank signal without a terminating stop pulse and the remaining 66 milliseconds of the spacing interval as the start pulse and first and second significant impulses of a code combination, the remainder of which is of marking nature by virtue of the operation of relay S6. This is the code combination representing the letter M, which would be printed by the local teletypewriter. If the interval of the steady spacing condition of the loop should be increased by 22 milliseconds, the teletypewriter would interpret the signal as representing the letter O, whereas if the interval should be decreased by 22 milliseconds, the teletypewriter would interpret the signal as representing the letter V. The operating time of relay S6 must exceed a normal character signal interval, ordinarily 163 milliseconds, to prevent the relay from following character signals during reception from the distant station, as previously described.

Relay S6, upon operating; (1) opens at its inner upper armature and back contact the locking circuit for relay S5 which now releases, and (2) closes at its lower armature and front contact a ground connection to a circuit traceable over conductor 304, interengaged contacts Nos. 5 and 5F on bank No. 3 of service switch K2, conductor 206, through the lower winding of send relay S2, conductor 207, resistor R44, conductor 208, rheostat R52, resistor R43, teletypewriter 210, to grounded positive battery 211. The ground termination added to the loop circuit of teletypewriter 210 now causes the teletypewriter to be placed in a marking condition, as described above.

Relay S5, upon releasing, (1) closes at its outer lower armature and contact the alternating current, or carrier, receiving path extending through the upper left-hand windings of input line repeating coil T1 from the radio receiver at station C, (2) closes at its upper armature and contact the operating circuit for receive relay S1, the circuit being traceable from ground connection 306, resistor R27, part of resistance of resistor R28, conductor 307, cathode and plate of vacuum tube V4, conductor 308, resistor R31, lower armature and contact of relay S3, upper armature and contact of relay S5, conductor 236, interengaged contacts Nos. 9 and 9F on bank No. 2 of service switch K2, conductor 255, through the lower winding of receive relay S1, resistor R30, to grounded positive battery. Receive relay S1 operates to its spacing position. The circuit is now in an idle condition.

*Receiving signals from distant station A*

As hereinbefore stated under "Sending from Station D" the first code signal, which is "Letters" superimposed on carrier current received through the radio transmitting and receiving stations B and C, is received at station D over conductors 241 and 223, impressed on the left-hand windings of input line repeating coil T1 and passed through band-pass filter FL1 and input transformer T2 to the receiver circuit wherein the repeated carrier current impulses are amplified and rectified to operate receive relay S1 to its marking contact. The send relay S2 will remain on its marking contact representing the idle condition due to relay S6 being in its operated position. Relay S6, in its operated position, provides at its lower armature and front contact a ground connection for the loop circuit of teletypewriter 210. Vacuum tube V6 will remain conducting, inasmuch as grounded positive battery 201 is connected through the interengaged Nos. 5 and 5F contacts on bank No. 2 of service switch K2, to a circuit extending over conductors 202, 203 and 301, rheostat R51 and resistor R50 to the grid of vacuum tube V6. Relay S3 will remain operated because of the conducting condition of vacuum tube V6. Relay S4 will be in a released condition because of the operated condition of relay S3, and inasmuch as receive relay S1 is in its marking position because of the marking signal received from the distant station A, ground connection 309 at the marking contact of receive relay S1 is now connected in place of grounded positive battery 302 at the spacing contact, to the grid of vacuum tube V7 in a circuit traceable over the armature of receive relay S1, conductor 303, interengaged contacts Nos. 9F and 9 on bank No. 3 of service switch K2, conductor 204, back contact and outer lower armature of relay S4, conductor 205, rheostat R41, resistor R36, to the grid of vacuum tube V7 and vacuum tube V7 now stops conducting to effect the release of relay S6. Relay S6, upon releasing, transfers the loop circuit of teletypewriter 210 from the ground at the front contact and lower armature of relay S6, to the back contact in the circuit just traced, extending over conductor 205, outer lower armature and back contact of relay S4, conductor 204, interengaged contacts Nos. 9 and 9F on bank No. 3 of service switch K2, conductor 303, to ground at the armature and marking contact of receive relay S1.

The distant teletypewriter at station A then transmits a "carriage return" and a "line feed" signal so that the teletypewriters at both ends of the system are in the same condition, and as hereinbefore stated, receive relay S1 by its intermittent operation between its marking and spacing contacts, in following the incoming message signals, transmits the message to the loop circuit of teletypewriter circuit 210, the timing circuit comprising resistor R36, rheostat R41 and condenser C23 with vacuum tube V8 connected as a diode across the rheostat R41 and resistor 36, being so designed that the longest spacing interval of 132 milliseconds is not sufficient to cause the vacuum tube V7 to conduct and operate relay S6.

*End of receiving transmission*

At the end of transmission, carrier current is removed at the distant station A from the radio channel and therefore from the line conductors 241 and 223 which extend through the input line repeating coil T1 causing receive relay S1 to operate to its normally idle, or spacing, contact. Grounded positive battery 302 connected to the spacing contact of receive relay S1 is connected to a circuit extending over conductor 303, interengaged contacts Nos. 9F and 9 of bank No. 3 of service switch K2, conductor 204, back contact and outer lower armature of relay S4, conductor 205, rheostat R41, resistor R36, to the grid of vacuum tube V7 and vacuum tube V7 starts conducting as the condenser C23 charges. Vacuum tube V7, upon beginning to conduct, does not operate relay S6 immediately because the operation of relay S6 is delayed for a period of approximately 229 milliseconds by the timing circuit. This transmits a 229-millisecond spacing interval to the loop circuit of teletypewriter 210 causing the teletypewriter to print an "M" character. This M character used as an end of transmission indication can be changed, as hereinbefore stated, to any of the other single transition characters blank, T, O, V or "letters" by adjusting the rheostat R41. When relay S6 is operated, the loop circuit of the local teletypewriter 210 is again terminated at the front contact of relay S6 and the voice-frequency carrier telegraph terminal is again in idle condition.

*One-way reversible four-wire operation*

By operating the service switch K2 to its second position the terminal equipment at station D is conditioned for operating a one-way reversible arrangement on a four-wire basis. The interengaged contacts on the four banks of service switch K2 remain unchanged in operating the switch from the first, or two-wire, position to the second, or four-wire, position, except in the following instance: on bank No. 4 contacts Nos. 2 and 6 are open.

Therefore, the main change from the two-wire to the four-wire arrangement is effected at bank No. 4 whereby conductors 213 and 214 are disconnected from each other at rotatable brush 239 and conductors 221 and 222 are disconnected from each other at rotatable brush 242 to effectively disconnect the alternating transmitting and receiving two-wire circuit path comprising conductors 241 and 223 from repeating coils T1 and T3. In this maner the transmitting and receiving paths utilized for four-wire operation are separate and independent of each other and no remote control equipment, such as switching relay CSR, is required at the radio transmitting and receiving stations C and B for automatically selecting the radio transmitter or radio receiver in accordance with the direction of transmission. In the four-wire arrangement the transmitting path at the sending terminal is always connected directly to the radio transmitter at the radio station and the receiving path is always connected directly to the radio receiver at such radio station. The alternating current transmitting path at station D for four-wire operation extends from radio transmitter CRT4 at station C, conductors 245, and 215, upper left-hand winding of line repeating coil T3, conductor 216 contacts 233, conductor 217, contact and inner lower armature of relay S4, conductor 218, contact No. 6 and feeder contact 5F interengaged by brush 240 on bank No. 1 of service switch K2, conductor 219, lower left-hand winding of repeating coil T3, conductors 220 and 246 and back to the radio transmitter CRT4. The alternating current receiving path at station D for the four-wire operation extends from the radio receiver CRR4 at station C, conductors 247 and 225, upper left-hand winding of input line repeating coil T1, conductor 226, condenser C1, outer lower armature and contact of relay S5, contact No. 2 and feeder contact No. 1F interengaged by brush 244 on bank 1 of service switch K2, conductor 227, lower left-hand winding of repeating coil T1, conductors 228 and 248, and back to radio receiver CRR4. It will be noted, with respect to the transmitting path, that conductors 221 and 222 are now disengaged at rotatable brush 242 on bank No. 4 of service switch K2, inasmuch as the switch upon being operated to its second position, causes brush 242 to move from its contact No. 5 to its contact No. 6 which is disconnected or unequipped, and with respect to the receiving path, that conductors 214 and 224 are now disengaged at rotatable brush 239 on bank 4 of service switch K2, inasmuch as the switch, upon being operated to its second position, causes brush 239 to move from its contact No. 1 to its contact No. 2, which is also disconnected or unequipped.

The remainder of the terminal equipment and operation thereof for a connection established on a four-wire basis is same as hereinbefore described for a connection established on a two-wire basis.

What is claimed is:

1. A transmission system having two stations, a normally deenergized radio channel of transmission interconnecting said stations, each of said stations comprising a start-stop transmitter, a receiver of start-stop code signals, a transmitting branch path normally deenergized during the idle periods between messages but automatically energized by a special signal in start-stop code at the start of a message, said transmitting branch path including a carrier frequency oscillator for impressing on said energized transmitting branch path a given frequency in a series of discrete impulses to form a signal wave corresponding to the start-stop signals of the wave transmitted to said channel by said transmitter, and a receiving branch path having a demodulating means for received carrier oscillations of said given frequency to reproduce the start-stop code impulses of the message signals incoming over said channel from the distant one of said stations, means for normally holding both said transmitters in marking condition and said transmitting branch paths disabled, and means whereby with said stations in said normal condition, transmission of successive code combinations initiated at one station of said system enables the transmitting branch path at said station to function and thereafter enables the receiving branch path at the distant station to function.

2. A transmission system including a plurality of terminal stations, a line circuit of transmission connecting one of said radio stations to one of said terminal stations, another line circuit of transmission connecting another of said radio stations to another of said terminal stations, a radio transmitter and a radio receiver at each of said radio stations, a start-stop transmitter and a receiver of start-stop code pulses at each of said terminal stations, means at each of said terminal stations for storing a potential for a predetermined interval of time at the end of a message transmitted from the local start-stop transmitter, and other means responsive to the potential accumulated at the end of said interval for automatically sending independently of said start-stop transmitter an end-of-message start-stop character signal to the receiver at its terminal station whereby said end-of-message character is recorded at the local receiver to indicate that the transmission channel is available for transmission from any of said terminal stations.

3. A transmission system including a plurality of radio stations, a plurality of terminal stations, a line circuit of transmission connecting one of said radio stations to one of said terminal stations, another line circuit of transmission connecting another of said radio stations to another of said terminal stations, a radio transmitter and a radio receiver at each of said radio stations, a start-stop transmitter and a receiver of start-stop code impulses at each of said terminal stations, each of said terminal stations including a transmitting branch path and an oscillator, the oscillator at each terminal station having means for generating a carrier current of a frequency identical to that of the oscillator at the other of said terminal stations, means under the joint control of a start-stop transmitter and its locally associated oscillator for impressing on a local transmitting branch path a series of discrete carrier current impulses corresponding in number to the code impulses of each of the signals transmitted by the start-stop transmitter at the local sending terminal station, means for also impressing a direct current on said local transmitting branch path, a receiving branch path having a demodulating means for received carrier current of said identical frequency to reproduce the direct current start-stop code impulses of the signals transmitted from the start-stop transmitter at the distant terminal station, and combined swiching and signal repeating means connected to the local transmitting branch path at each of said radio stations and responsive to said direct current and said series of discrete carrier current impulses for connecting said radio transmitter to its own repeating means and for repeating said carrier current impulses to said radio transmitter means at each of said terminal stations operative in response to the current of said direct current source and said series of discrete carrier current impulses for remotely controlling the radio transmitter and the radio receiver at both radio stations.

4. A transmission system including a plurality of radio stations, a plurality of terminal stations, a line circuit of transmission connecting one of said radio stations to one of said terminal stations, another line circuit of transmission connecting another of said radio stations to another of said terminal stations, a radio transmitter and a radio receiver at each of said radio stations, a start-stop transmitter and a receiver of start-stop code impulses at each of said terminal stations, each of said terminal stations including a transmitting branch path associated with a carrier frequency oscillator and having means for modulating the resultant oscillations according to the code pulses and a receiving branch path having demodulating means for received carrier oscillations to reproduce the code pulses, means at each of said terminal stations operative in response to a certain signal of the transmitted code whereby radiation of energy from the radio transmitter is prevented during and after the transmission of said certain signal over said transmission channel.

5. A transmission channel including a plurality of radio stations, a plurality of terminal stations, a line circuit of transmission connecting one of said radio stations to one of said terminal stations, another line circuit of transmission connecting another of said radio stations to another of said terminal stations, a radio transmitter and a radio receiver at each of said radio stations, a start-stop transmitter and a receiver of start-stop code impulses at each of said terminal stations, means at each of said terminal stations automatically operative at the end of transmission of a message from one of said terminal stations for determining an interval of time of definite duration but exceeding that of the ordinary short pauses between impulses of a start-stop character signal, and means at each of said terminal stations operating independently of the transmitters at their respective stations for automatically recording at the receivers of their respective terminal stations, at the expiration of said interval of time, an end-of-message start-stop character to indicate that said transmission channel is available for transmission from any of said terminal stations.

6. A transmission system including a plurality of radio stations, a plurality of terminal stations, a line circuit of transmission connecting one of said radio stations to one of said terminal stations, another line circuit of transmission connecting another of said radio stations to another of said terminal stations, a radio transmitter and a radio receiver at each of said radio stations, a start-stop transmitter and a receiver of start-stop code impulses at each of said terminal stations, means at each said terminal stations automatically operative at the end of transmission of a message from any one of said terminal stations to send an end-of-message start-stop character signal to the receiver at its local terminal station whereby the end-of-message character is recorded at the receiver at the local terminal station to indicate that the transmission channel is available for transmission from any of said terminal stations, and other means at each of said terminal stations automatically operative upon the recordation of said end-of-message start-stop character at each of said terminal stations for maintaining the transmitters at their respective terminal stations in a normal condition.

7. A transmission system including a plurality of radio stations, a plurality of terminal stations, a line circuit of transmission connecting one of said radio stations to one of said terminal stations, another line circuit of transmission connecting another of said radio stations to another of said terminal stations, a radio transmitter and a radio receiver at each of said radio stations, a start-stop transmitter and a receiver of start-stop code impulses at each of said terminal stations, each of said terminal stations including a transmitting branch path associated with a carrier frequency oscillator, means for modulating the resultant oscillations according to the code pulses, a receiving branch path having demodulating means for received carrier oscillations to reproduce the code pulses, means at each of said terminal stations operative in response to the components of the modulated current of carrier frequency for remotely controlling the radio transmitter and the radio receiver at both radio stations, other means at each of said terminal stations automatically operative at the end of transmission of a message from any one of said terminal stations to send an end-of-message start-stop character signal to the receiver at its local terminal station whereby the end-of-message character is recorded at the receiver at the local terminal station, and still other means at each of said terminal stations automatically operative upon the recordation of said end-of-message start-stop character for transferring the line circuit of transmission of the sending terminal station from the start-stop transmitter to the start-stop receiver.

8. A transmission system including a plurality of radio stations, a plurality of terminal stations, a line circuit of transmission connecting one of said radio stations to one of said terminal stations, another line circuit of transmission connecting another of said radio stations to another of said terminal stations, a radio transmitter and a radio receiver at each of said radio stations, a start-stop transmitter and a receiver of start-stop code impulses at each of said terminal stations, and means at each of said terminal stations automatically operative at the end of transmission of a message from the sending transmitter at a terminal station to send an end-of-message start-stop character signal to the receiver at its respective terminal station whereby said end-of-message character is recorded at said receiver at its respective terminal station to indicate that said system is available for transmission from any of the said terminal stations, and other means at each of said terminal stations automatically operative upon the recordation of said end-of-message start-stop character for placing its respective terminal station in a receiving position.

9. In a communication system, a communication channel, a plurality of stations associated with said channel, a start-stop code impulse transmitter and a start-stop code impulse receiver at each station, and means at each station for storing a potential for a predetermined interval of time after the end of transmission from any of said code impulse transmitters, and other means at each of said stations responsive to the potential accumulated on its respectively associated one of said means for automatically transmitting independently of the local code impulse transmitter an end-of-message start-stop code signal for recordation at the local receiver.

10. In a communication system, a communication channel, a plurality of stations associated with said channel and each having code transmitting and code receiving means normally adjusted to an idle receptive condition, a plurality of storing means at each of said stations for normally maintaining stored potentials, space discharge devices normally active at each of said stations in response to said stored potentials, respectively, means controlled by said code transmitting means at any one of said stations for discharging the stored potentials on said plurality of storing means at said one station and making inactive said space discharge devices at said one station whereby said one station is conditioned to an active message transmitting condition, and other means at each of the other of said stations controlled by said code transmitting means at said one station for discharging the stored potential on one only of said plurality of storing means at the other of said stations and making inactive one only of said discharge devices at the other of said stations whereby the other of said stations is conditioned to active message receiving condition.

11. In a communication system, a communication channel, a plurality of stations associated with said channel and each having code transmitting and code receiving means normally adjusted to an idle receptive condition, means for locally conditioning any one of said stations to an active transmitting condition, means responsive to signals transmitted by said one station for conditioning others of said stations to an active receiving condition, means automatically operable a predetermined interval after the end of transmission from said one station for transmitting an end-of-message signal independently of the code transmitting means thereat, and means controlled by said automatically operable means for restoring all of said stations to the idle receptive condition.

12. In a communication system, a plurality of stations associated with said channel, a start-stop code impulse transmitter and a start-stop code impulse receiver at each station, transmitting means responsive to the operation of said transmitter at each station, receiving means at each station responsive to code impulses transmitted by another of said stations for controlling the code impulse receiver local to said receiving means, and storing means at each of said stations for automatically accumulating a potential for a predetermined interval of time after the end of transmission from any station, and means responsive to the potential accumulated at the expiration of said interval for transmitting to its local code impulse receiver independently of any of the code impulse transmitters an end-of-message code signal.

13. In a communication system, a radio transmitter adapted to transmit voice frequency modulated radio carrier current to a remote radio receiver, a voice frequency signal current generator for modulating said radio frequency carrier current, a telegraph code transmitter adapted to modulate said voice frequency signal current on an on-and-off basis for marking and spacing signals, means including a potential storing element for automatically timing the storing of a potential on said element for a predetermined interval at the end of transmission from said telegraph code transmitter, and other means responsive to the potential stored at the expiration of said interval for suppressing radio frequency carrier current transmission by said radio transmitter.

14. A transmission system comprising a plurality of radio stations, a terminal station associated with each of said radio stations, a start-stop transmitter and a receiver of start-stop code impulses associated with each of said terminal stations, means at each of said terminal stations automatically operative at the end of message transmission for timing an interval of definite duration longer than spacing intervals ordinarily occurring in start-stop character signals, and means at each of said terminal stations independent of the transmitters thereat and operable automatically at the end of said interval for causing their respective receivers to record an end-of-message start-stop character to indicate availability of said system for transmission from any of said terminal stations.

ALBERT WILSON.

REFERENCES CITED

The following references are of record in the file of this patent:

UNITED STATES PATENTS

| Number | Name | Date |
|---|---|---|
| 1,523,377 | Brady | Jan. 13, 1925 |
| 1,823,948 | McCann | Sept. 22, 1931 |
| 1,904,567 | Taylor | Apr. 18, 1933 |
| 2,064,639 | Whitelock et al. | Dec. 15, 1936 |
| 2,101,668 | Bishop et al. | Dec. 7, 1937 |
| 2,165,063 | MacKay | July 4, 1939 |
| 2,421,017 | Deloraine et al. | May 27, 1947 |